United States Patent [19]

Golinelli et al.

[11] 4,441,257

[45] Apr. 10, 1984

[54] PROBE FOR CHECKING LINEAR DIMENSIONS

[75] Inventors: Guido Golinelli, Bologna; Narciso Selleri, Monteveglio, both of Italy

[73] Assignee: Finike Italiana Marposs S.p.A., S. Marino di Bentivoglio, Italy

[21] Appl. No.: 418,628

[22] Filed: Sep. 16, 1982

[30] Foreign Application Priority Data

Nov. 20, 1981 [IT] Italy .................................. 3579 A/81

[51] Int. Cl.³ .............................................. G01B 7/02
[52] U.S. Cl. ................................. 33/174 L; 33/172 E
[58] Field of Search ............ 33/169 R, 172 B, 172 E, 33/174 L, 174 PC

[56] References Cited

U.S. PATENT DOCUMENTS

| | | | |
|---|---|---|---|
| 3,541,924 | 11/1970 | Gambin | 90/62 |
| 3,785,056 | 1/1974 | Schiler | 33/169 R |
| 4,136,458 | 1/1979 | Bell et al. | 33/172 E |
| 4,270,275 | 6/1981 | McMurtry | 33/169 R |
| 4,364,180 | 12/1982 | Willhelm et al. | 33/174 L |
| 4,375,723 | 3/1983 | McMurtry | 33/174 L |

FOREIGN PATENT DOCUMENTS

| | | | |
|---|---|---|---|
| 2705787 | 8/1977 | Fed. Rep. of Germany | 33/169 R |
| 2905172 | 8/1980 | Fed. Rep. of Germany | 33/172 E |
| 56-60303 | 5/1981 | Japan | 33/169 R |

*Primary Examiner*—Richard R. Stearns
*Attorney, Agent, or Firm*—Stevens, Davis, Miller & Mosher

[57] ABSTRACT

A probe for checking linear dimensions comprising an arm movable along two opposite directions with respect to a support, a pair of electrical contacts fixed with respect to the support and a pair of flexible laminae having first ends connected to the movable arm and carrying at second ends a pair of movable electrical contacts, which—in rest conditions—are closed against a relevant one of the fixed contacts. An element fixed to the movable arm is adapted to cooperate with two surfaces coupled to the laminae next to the movable contacts, for causing, upon displacements of the movable arm from a rest position, release of either of the movable contacts from the corresponding fixed contact.

10 Claims, 7 Drawing Figures

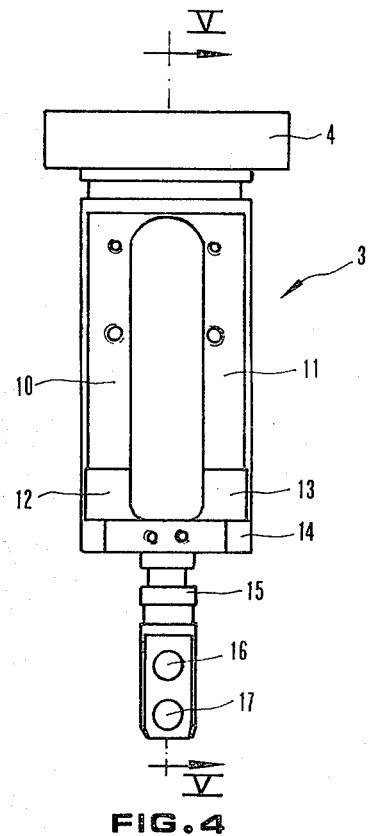
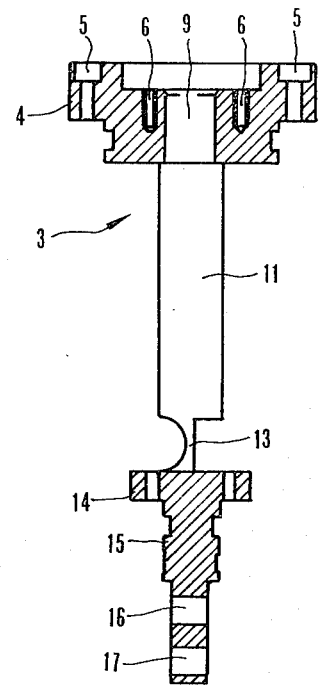
FIG.4
FIG.5
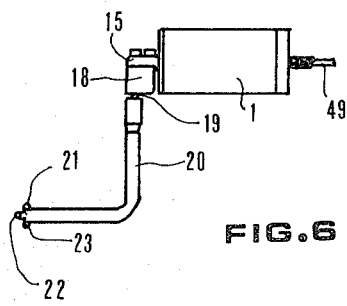
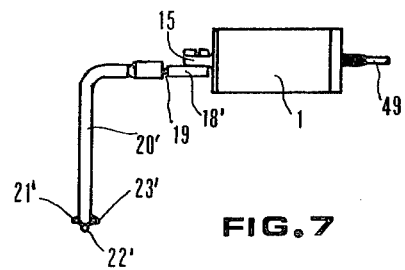
FIG.6
FIG.7

PROBE FOR CHECKING LINEAR DIMENSIONS

The present invention relates to a probe for checking linear dimensions, like dimensions of mechanical pieces, including support means, an arm movable with respect to the support means and having a portion defining a longitudinal geometrical axis, connection means for connecting the arm to the support means for allowing the arm to displace with respect to the support means in two opposite directions, feeler means, for touching the surface of the piece to be checked, coupled to an end of the movable arm and switch means with electrical contacts, that are closed in rest condition, associated with the arm and the support means.

It is known that the so-called co-ordinate measuring machines, in existance for many years now, typically comprise heads or probes that are displaced, by means of slides, in order to bring a feeler—fixed to a movable arm of the head—into contact with parts of a piece to be checked.

These heads normally act as switches in that they include one or more pairs of electrical contacts, closed when the movable arm is in a rest position, which open when the movable arm displaces from the rest position, as a consequence of the feeler contacting the piece to be checked.

The opening of the contacts generates a signal that commands the reading of signals provided by position transducers associated with the slides.

Therefore these heads, called "touch triggers", do not provide an actual measurement signal, but simply a logic signal, indicating whether the arm is displaced from a rest position.

Obviously in order that the measurement value—detected by the transducers associated with the slides—be accurate, it is necessary that the opening of the contacts in the head occurs with a good repeatability, i.e. exactly when there occur prefixed displacements of the arm from the rest position.

It is also known that the increasing use of sophisticated numerical control systems, like CNC ("Computer Numerical Control") systems in machine tools, like lathes and machining centers, has developed the use of "touch trigger" heads in these machines too, to the purpose of improving in the machining accuracy and further automating the operation of the machines.

However, the application on metal-cutting machine tools of heads identical or similar to those used in co-ordinate measuring machines presents some inconveniences, substantially due to the presence, in these machine tools, of vibrations and stresses that are considerably stronger than those occurring in the co-ordinate measuring machines and, in general, due to the most adverse working conditions.

The object of the present invention is to provide a probe of the "touch trigger" type that is particularly suitable for the application on metal-cutting machine tools, specifically, for example, with regard to repeatability and sturdiness.

This object is attained through a probe of the type outlined at the beginning of the description wherein, according to the invention, said switch means comprise two flexible laminae with a first end coupled to the movable arm and a second end free; a control device, coupled to the movable arm, including first reference surfaces; and second reference surfaces associated with the laminae; said electrical contacts including two movable contacts fixed to the laminae adjacent to the free ends of the laminae and to the second reference surfaces and corresponding fixed contacts fastened to the support means; said first reference surfaces being adapted for cooperating, further to the displacements of the movable arm from a rest position, with the second reference surfaces, for resiliently deflecting either of the laminae and separating either of the movable electrical contacts from the corresponding fixed contact.

The invention is now described in more detail according to a preferred embodiment, given by way of non-limiting example and illustrated in the accompanying drawings, in which:

FIG. 4 is a reduced-scale elevational view showing some details of the head in FIGS. 1-3;

FIG. 5 is a sectional view of the details shown in FIG. 4, viewed along line V—V in FIG. 4;

FIG. 6 and FIG. 7 show in a furtherly reduced-scale, two heads with different movable arms.

Figure 1:
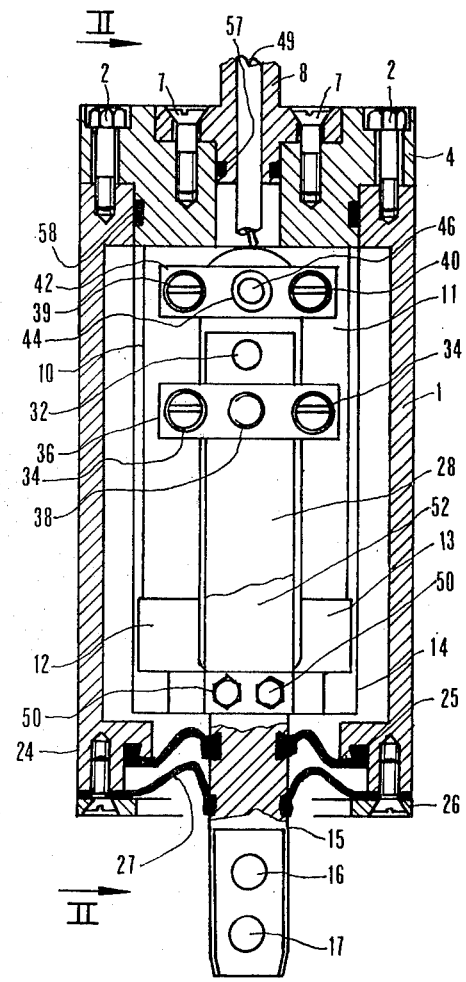
FIG. 1 is a partly in section elevational view of a "touch trigger" head.
Figure 2:
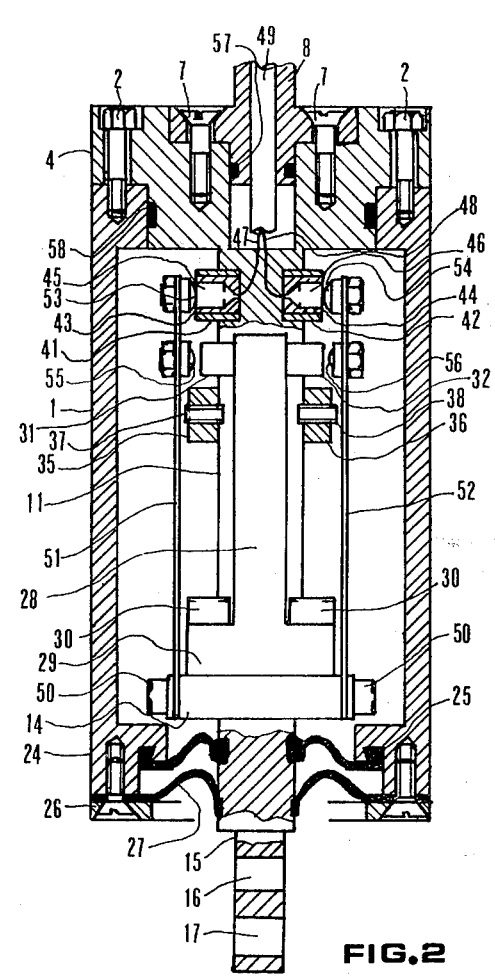
FIG. 2 is a partially cross-sectioned view of the head shown in FIG. 1, viewed along line II—II indicated in FIG. 1.

The probe or head shown in FIGS. 1 and 2 includes a substantially cylindrical outer casing 1, to which there is coupled, by means of screws 2, an integral member 3, made of a machined single piece the structure of which is shown more clearly in FIGS. 4 and 5.

Member 3 includes an upper base 4 with through holes 5 for the passage of screws 2, threaded holes 6 for clamping a cableclamp 8 to base 4—by means of screws 7 (FIGS. 1 and 2)—and a through hole 9.

Two adjacent longitudinal support elements 10 and 11, also shown in FIG. 4, are integrally connected to base 4 and, by means of two connection portions 12 and 13, to a base 14. Portions 12 and 13 of elements 10 and 11 include thin, resiliently flexible, sections that substantially define a horizontal axis of rotation of base 14 with respect to elements 10 and 11.

A stem 15, which also forms an integrating portion of member 3, defines a part—coaxial with casing 1—of a movable arm and has holes 16 and 17. FIGS. 6 and 7 show how further elements 18,18', 20,20' of different kinds of movable arms can be fixed to stem 15. Elements 18, 20 and 18', 20' are coupled by means of pins 19 made of a relatively fragile material, that form weakened sections where breakage can occurr in order to protect the other elements of the probe from stresses deriving from accidental impacts of feelers 21,22,23; 21',22',23', located at the ends of elements 20 and 20'; feelers 21-23; 21'-23' are off-set with respect to the longitudinal axis of the probe.

A sealing gasket 25 is coupled to stem 15 and to a drilled base 24 of casing 1. To base 24 there is fixed a drilled plate 26; a yieldable protection diaphragm 27, resistant to the impact of chips, has an outer border sandwiched between base 24 and plate 26 and an inner border coupled to stem 15.

An element i.e. a bar 28 with a substantially T-shaped longitudinal profile has a base 29 fastened—by means of screws 30—to base 14 of member 3 and extends in the longitudinal direction of the probe between elements 10 and 11.

The probe comprises switch means having a control device including two reference members 31 and 32—of a wear resistant material of considerable hardness, like carbide—transversally fixed, in an individually adjustable way, to the stem of bar 28.

Figure 3:
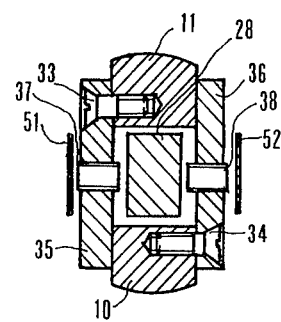
FIG. 3 is a cross-section of the armset of the head shown in FIG. 2.

To elements 10 and 11 there are fixed, by means of screws 33 and 34 (FIG. 3), two crosspieces 35 and 36 with threaded holes adjustably housing two dowels 37 and 38, whose external ends form limit or stop surfaces.

Near crosspieces 35 and 36, two other crosspieces 41 and 42 are fixed to elements 10 and 11, by means of screws 39 and 40. Each of crosspieces 41 and 42 defines, in its central portion, a seat for housing an insert 43 and 44 in fiber glass, that contains an electrical contact 45 and 46 made of a wear resisting material of considerable hardness, and conducting electrical current, like carbide.

Inserts 43 and 44 are glued to their associated seats by means of an appropriate resin.

To contacts 45 and 46 there are welded electrical wires 47 and 48 (FIG. 2) that come out of casing 1 through a cable 49 that passes through cableclamp 8.

Base 14 of member 3 has two lateral surfaces to which there are fixed, by means of screws 50, the lower ends of two flat laminae 51 and 52 that are resiliently flexible, one of which, 52, is partially shown in FIG. 1.

Laminae 51 and 52 elongate along almost the entire length of casing 1 and bear near their upper free ends two carbide electrical contacts 53 and 54 that, when the probe is in rest conditions, steadily contact—with a certain amount of force—contacts 45 and 46.

Near contacts 53 and 54 the laminae 51 and 52 bear two carbide references or limit stops 55 and 56 facing reference elements 31 and 32.

The probe sealing is ensured by two elastic rings 57 and 58 that are placed between cableclamp 8 and base 4 and between casing 1 and base 4 respectively.

The probe works in the following way. Under rest conditions the pairs of contacts 45,53; 46,54, which are parts of the switch means of the probe, close an electrical circuit including laminae 51 and 52 and base 14.

It is assumed that, as a consequence of the mutual displacement of the probe and the piece to be checked, one of feelers 21,22,23, or 21', 22',23' contacts the piece surface.

Let it also be assumed that said mutual displacement causes, withr reference to FIG. 2, a counterclockwise rotation of stem 15, of base 14 and of bar 28 about the axis defined by portions 12 and 13.

In the initial phase of this counterclockwise rotation lamina 51 keeps contacts 46 and 54 closed, as under rest conditions the laminae are subjected to a proper initial preload, not shown in the Figures.

After a prestroke of a prefixed entity—in the course of which the initial flexure of lamina 52 increases and that of lamina 51 decreases—member 31 contacts limit stop 55 and consequently immediately causes (as limit stop 55 is immediately adjacent to contact 53) the release of contact 53 from its associated contact 45. Therefore the probe sends a logic signal to the numeric control system to which it is connected. This signal is used for detecting the mutual position of the probe and of the piece (depending on this position the dimension or required size is calculated) and for ending their approach.

A possible continuation of the rotation of bar 28 causes, after an extra-stroke of a prefixed entity has occurred, the contacting of lamina 52, or of a limit surface fixed to lamina 52, with dowel 38 and consequently from this instant onwards the contact force between contacts 46 and 54 does not vary even if rotation continues so causing increasing of the deflection of the section of lamina 52 extending from dowel 38 to base 14, this section being considerably longer than the short section extending from dowel 38 to contact 54.

Laminae 51 and 52 are considerably long, so as to reduce to a negligible entity the slidings between contacts 45,53;46,54 and to minimize the applied contact forces.

The bent shape of element 20 or 20' of the arm of the probe enables to detect dimensions along two axes that are perpendicular while pre-strokes and other operating conditions remain substantially identical, since the straight lines that join the contacting point of feelers 21, 22, 23 or 21',22',23' against the piece with the intersection of the longitudinal axis of the probe and of the axis of rotation defined by portions 12 and 13 substantially from a 45 degree angle with the longitudinal axis of the probe.

It is obvious that changes and modifications may be made to the probe shown in the drawings without departing from the scope of the invention.

What is claimed is:

1. A probe for checking linear dimensions, like dimensions of mechanical pieces, including support means, an arm movable with respect to the support means and having a portion defining a longitudinal geometrical axis, connection means for connecting the arm to the support means for allowing the arm to displace with respect to the support means in two opposite directions, feeler means for touching the surface of the piece to be checked, coupled to an end of the movable arm, and switch means with electrical contacts, that are closed in rest condition, associated with the arm and the support means, wherein said switch means comprise two flexible laminae with a first end coupled to the movable arm and a second end free; a control device coupled to the movable arm including first reference surfaces; and second reference surfaces coupled to the laminae; said electrical contacts including two movable contacts fixed to the laminae next to the free ends of the laminae and to the second reference surfaces and corresponding fixed contacts fastened to the support means; said first reference surfaces being adapted for cooperating, further to the displacements of the movable arm from a rest position, with the second reference surfaces, for resiliently deflecting either of the laminae and separating either of the movable electrical contacts from the corresponding fixed contact.

2. A probe according to claim 1, wherein said support means include two adjacent elements elongated along said longitudinal axis, said control device including a bar placed between the two adjacent elements.

3. A probe according to claim 2, wherein said support means comprise two crosspieces fixed to said adjacent elements, said fixed contacts being coupled to the crosspieces.

4. A probe according to claim 1, wherein said switch means comprise an electrical circuit including said fixed and movable contacts, the laminae and the connection means.

5. A probe according to any of claims 1 to 4, wherein said switch means include two stop elements fixed to the support means and adapted to contact the laminae next to the movable contacts and the second reference surfaces.

6. A probe according to claim 1, wherein said support means include two adjacent elements elongated along said longitudinal axis, the connection means including two portions with two resiliently flexible sections, connected to a common base, the two flexible sections being adapted to define an axis of rotation of the arm that is perpendicular to said longitudinal axis.

7. A probe according to claim 6, wherein said support means further include an outer substantially cylindrical casing and a member, fixed to the outer casing that includes said two adjacent elements.

8. A probe according to claim 7, further comprising a sealing gasket coupled to the outer casing and to the movable arm, a closure plate coupled to said outer casing, a protection diaphragm coupled to the closure plate and to the movable arm, a cableclamp coupled to said member and sealing means arranged between the cableclamp and the member and between the member and the outer casing.

9. A probe according to claim 1, wherein said support means, the connection means and the movable arm include an integral member including a first base, two adjacent elements elongated along said longitudinal axis, two portions including resiliently flexible sections and a second base that forms an arm portion, said resiliently flexible sections being adapted for allowing rotational displacements of the arm about an axis that is perpendicular to said longitudinal axis.

10. A probe according to any of claims 1 to 4 and 6 to 9, wherein said arm includes a bent portion that carries at an end said feeler means, the feeler means being offset with respect to said longitudinal geometrical axis, for checking linear dimensions according to two perpendicular axes.

* * * * *